UNITED STATES PATENT OFFICE.

HENRY R. CLOTHIER, JOHN GROGAN, AND JOHN McMULLEN, OF PHILADELPHIA, PENNSYLVANIA.

COMPOSITION PAINT FOR METALLIC SURFACES.

SPECIFICATION forming part of Letters Patent No. 286,117, dated October 2, 1883.

Application filed December 30, 1882. (No specimens.)

*To all whom it may concern:*

Be it known that we, HENRY R. CLOTHIER, JOHN GROGAN, and JOHN MCMULLEN, citizens of the United States, residing at Philadelphia, in the county of Philadelphia and State of Pennsylvania, have invented a certain new and useful Paint for Metallic Surfaces; and we do hereby declare the following to be a full, clear, and exact description of the invention.

Our invention has for its object to provide a composition or paint which shall be unaffected by water or exposure to solar and atmospheric influences.

Our invention consists of a composition composed as follows: seven pounds of dry whiting; two pounds of dry oxide of iron; two pounds of dry oxide of zinc; one pound of dry lamp-black; one quart No. 1 coach-body varnish; one quart of turpentine japan; one pint turpentine. These are compounded as follows: First mingle the fluids and then mix in therewith the solids. Afterward run the mass through a paint-mill. The product is a plastic composition, which may be applied as a mortar or plaster. To use as a paint it should be thinned down with turpentine to the proper consistency for the purpose. Dry color of any desired shade or shades may be added; but such coloring-matter is not an essential part of our invention, as the mixture itself may be used without additional color.

This compound is intended, mainly, as a paint for metals; but we do not confine its use thereto, as it may be applied, if desired, in general, as common paint is.

What we claim as our invention is—

The composition herein described, consisting of whiting, oxide of iron, oxide of zinc, lamp-black, coach-body varnish, turpentine japan, and turpentine, in or about the proportions specified.

In testimony that we claim the foregoing we have hereunto set our hands this 23d day of December, 1882.

HENRY R. CLOTHIER.
JOHN GROGAN.
JOHN McMULLEN.

Witnesses:
DANIEL D. PAWL,
CHARLES LEIBFRIED.